United States Patent
Mosca et al.

(10) Patent No.: US 7,121,447 B2
(45) Date of Patent: Oct. 17, 2006

(54) ULTRASONIC WELDING APPARATUS

(75) Inventors: Timo Mosca, Elztal-Neckarburken (DE); Peter Lüdtke, Buchen (DE)

(73) Assignee: Maschinenfabrik Gerd Mosca AG, Waldbrunn (DE)

( * ) Notice: Subject to any disclaimer, the term of this patent is extended or adjusted under 35 U.S.C. 154(b) by 0 days.

(21) Appl. No.: 10/844,870

(22) Filed: May 13, 2004

(65) Prior Publication Data

US 2004/0232202 A1 Nov. 25, 2004

(30) Foreign Application Priority Data

May 23, 2003 (DE) ................. 103 23 783

(51) Int. Cl.
*B23K 5/20* (2006.01)
*B23K 37/00* (2006.01)
*B29C 65/00* (2006.01)
*B32B 37/00* (2006.01)

(52) U.S. Cl. ............... 228/1.1; 228/5.7; 156/73.1; 156/580.2

(58) Field of Classification Search ............... 228/1.1, 228/110.1; 156/73.1–73.4, 580.1, 580.2
See application file for complete search history.

(56) References Cited

U.S. PATENT DOCUMENTS

| | | | | |
|---|---|---|---|---|
| 3,639,969 A | * | 2/1972 | Potin et al. ............. | 29/408 |
| 3,670,394 A | * | 6/1972 | Daniels et al. ............. | 228/110.1 |
| 3,756,900 A | * | 9/1973 | Michel ............. | 156/580.2 |
| 4,980,213 A | * | 12/1990 | Obeda ............. | 428/57 |
| 5,464,488 A | * | 11/1995 | Servin ............. | 156/73.4 |
| 5,746,856 A | * | 5/1998 | Hendershot et al. ............. | 156/73.4 |
| 6,089,438 A | * | 7/2000 | Suzuki et al. ............. | 228/1.1 |
| 6,596,109 B1 | * | 7/2003 | Posa et al. ............. | 156/73.2 |
| 6,797,088 B1 | * | 9/2004 | Solinski ............. | 156/73.4 |
| 6,824,630 B1 | * | 11/2004 | Oishi et al. ............. | 156/73.1 |
| 2005/0167054 A1 | * | 8/2005 | Morschner et al. ............. | 156/580.1 |

FOREIGN PATENT DOCUMENTS

| | | |
|---|---|---|
| DE | 29 11 634 | 9/1980 |
| DE | 39 11 634 A1 | 10/1990 |
| DE | 39 34 560 | 4/1991 |
| DE | 196 14 634 | 10/1997 |
| EP | 0 248 293 B1 | 7/1990 |
| EP | 0 551 244 | 7/1993 |

\* cited by examiner

*Primary Examiner*—Lynne R. Edmondson
(74) *Attorney, Agent, or Firm*—Muirhead & Saturnelli, LLC

(57) ABSTRACT

In an ultrasonic welding apparatus comprising an ultrasonic sonotrode and a backing plate, flat workpieces to be welded are pressed between the sonotrode and the backing plate. Projections are provided on a portion of the surface of the sonotrode and on a portion of the surface of the backing plate, each projection-bearing surface portion being adjoined by a smooth portion. The flat workpieces are for example ends of a strapping tape formed in a loop around a package in a strapping machine and the aim is to produce a weld of increased strength.

16 Claims, 2 Drawing Sheets

ULTRASONIC WELDING APPARATUS

CROSS-REFERENCES TO RELATED APPLICATIONS

This application claims the priority of German patent application Ser. No. 103 23 783.6 filed May 23, 2003, the subject-matter of which is incorporated herein by reference.

FIELD OF THE INVENTION

The invention concerns an ultrasonic welding apparatus and a closure assembly for a strapping machine for welding a loop of a strapping tape, which includes such an ultrasonic welding apparatus.

BACKGROUND OF THE INVENTION

One form of ultrasonic welding apparatus includes an ultrasonic sonotrode for pressing flat workpieces to be welded, against a backing or counter plate. Such an ultrasonic welding apparatus for a strapping machine is to be found for example in DE 39 11 634 A1, DE 39 34 560 A1, DE 196 14 634 A1 and EP 0 551 244 A1 to which reference is hereby directed.

In the case of those ultrasonic welding apparatuses, the surface of the ultrasonic sonotrode has projections thereon. In the EP 0 551 244 A1 the surface of the backing plate is also provided with projections. The projections may be for example in the form of ribs of a generally triangular cross-sectional configuration. At the beginning of each ultrasonic welding operation, each rib produces a high level of local contact pressure. That ensures that, in the region of the respective projection on the sonotrode, a high proportion of the ultrasonic energy is introduced into the respective workpiece to be welded and the material of the workpiece to be welded, usually a tape comprising a thermoplastic material, is subjected to initial melting in that region. Starting from that melting region at the beginning of the welding operation in the proximity of the respective ribs, the size of the region which has been melted under the effect of the ultrasound, with increasing input of energy into the welding location, progressively increases until the desired effect of welding through the entire welding region has been achieved. After the welding procedure has been effected the sonotrode is moved away from the backing plate and the tape loop is suitably released from the backing plate so that the welding apparatus is then available for welding together two new workpiece portions.

Welding apparatuses of that kind are used with great success at the present time as closure assemblies for strapping machines. They are however also suitable for other situations of use in which for example flat pieces of plastic material have to be joined together.

When welding strapping tapes, it is to be observed that the tensile strength of the welded join is basically below the tensile strength of the plastic tape itself. In addition a high degree of variation in the tensile strengths of the welded joins is observed. It is desirable to provide a welding apparatus for welding by means of ultrasound, which ensures more reliable welding. It is also desirable to provide an ultrasonic welding apparatus which is effective to provide for progressive formation of the welded join between two workpiece portions and to provide an ultrasonic welding apparatus which is operable to produce welded joins of greater consistency. It is also desirable to provide a closure assembly for a strapping machine for welding a loop of a strapping tape, including an ultrasonic welding apparatus according to the invention.

SUMMARY OF THE INVENTION

In accordance with the principles of the present invention the foregoing and other objects are attained by a welding apparatus for welding by means of ultrasound, comprising an ultrasonic sonotrode operable to press flat workpiece portions to be welded against a backing plate. The ultrasonic sonotrode and the backing plate each have mutually oppositely disposed surfaces, each of those surfaces having at least one surface portion provided with projections and one smooth surface portion.

It will be appreciated that each of the mutually oppositely disposed surfaces of the sonotrode and the backing plate serves to firmly contact one side of the workpieces during welding. It will further be appreciated that each of the mutually oppositely disposed surfaces of the ultrasonic sonotrode on the one hand and the backing plate on the other hand may also have a plurality of profiled, that is to say projection-bearing, portions and/or a plurality of smooth portions.

As already indicated above the welding apparatus in accordance with the invention, in a practical embodiment thereof, can form a component part of a closure assembly for a strapping machine which welds a loop of a strapping tape, for example around one or more articles to be strapped.

In accordance with a practical feature of the invention, the portion of the surface of the ultrasonic sonotrode, which is provided with projections, is disposed in opposite relationship to a smooth portion of the surface of the backing plate, and vice-versa. That can ensure that, in regions in which a surface of the welded join is deformed by the projections, the other surface of the welded join remains undeformed. In that way, only one of the two workpiece portions which bear against each other in the welded join is deformed while the surface of the other workpiece portion remains unaffected.

In accordance with another feature of the invention, when carrying out a welding operation, the smooth portion of a said surface presses against that part of a workpiece portion, by way of which forces are applied to the weld. That ensures that deformation of the workpiece material, by virtue of the projections on the surfaces of the welding apparatus, is limited to the regions which carry only a small proportion of the load applied to the welded join. The highly loaded parts of the workpiece portions, by way of which forces are applied to the weld, are substantially free of deformation.

When dealing with strapping tapes, the ends of the tape are generally cut off in the proximity of the welded join. A cut edge is thus formed at each of the two ends of the tape, at respective sides of the welded join. The portion of the surface of the sonotrode, which is provided with projections, is in the proximity of the cut edge of that tape end which presses against the sonotrode. Equally, the portion of the surface of the backing plate, which is provided with projections, is disposed in the proximity of the cut edge of the tape end which bears against the backing plate. No tensile forces act on the strapping tapes in the proximity of their respective cut edges. The tensile forces occur in the actual loops themselves, formed by the strapping tape, and are applied by way of the loops to the sides of the welded join, which are in opposite relationship to the cut edges at the tape ends. In that region the respective tape ends are free of deformation as here there are no projections which are pressed against the material of the tape ends. Therefore, at the two sides of the weld, the tensile force in the loop is applied to a substantially undeformed portion of the tape at the welded join. The weld portion formed by the projections only forms a backing to the production of an intimate connection in respect of the materials involved and itself carries no or only slight tensile forces.

In a practical context the height of the projections is to be selected to be no greater than the thickness of one of the two flat workpiece portions to be welded. In a configuration in which the projections are each impressed into the workpiece material in the proximity of the respective cut edges of the tape ends, that can ensure that in actual fact it is only the non-loaded layer portion of the tape that is deformed by the projections, while the loaded layer of the tape is not substantially influenced in respect of its shape.

In a practical feature, both on the sonotrode and also on the backing plate, the surface portion having projections extends substantially over half the entire surface, while the other half of the surface remains free of projections.

Further objects, features and advantages of the invention will be apparent from the description hereinafter of a preferred embodiment of the invention.

DESCRIPTION OF THE PREFERRED EMBODIMENTS

Figure 1:
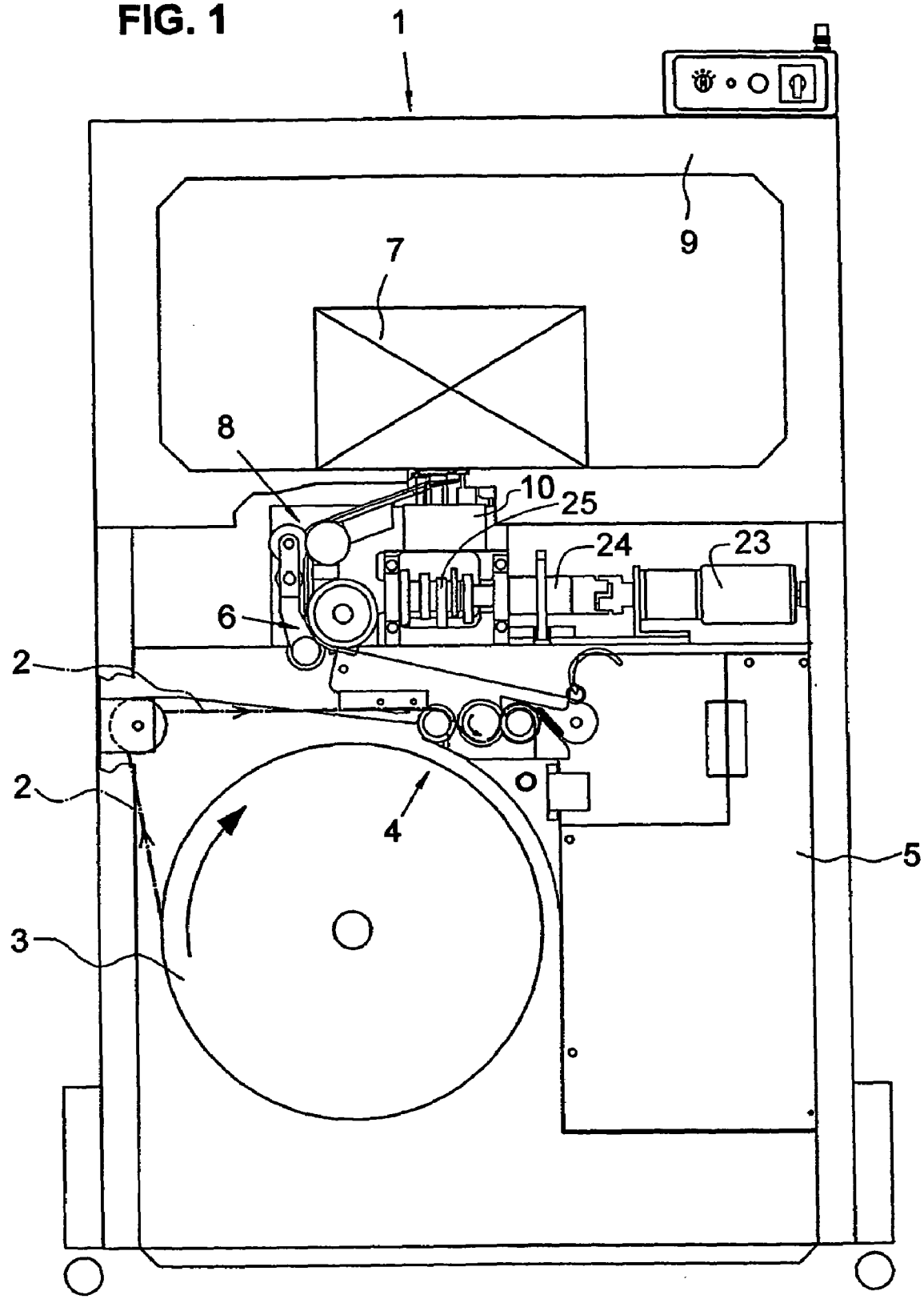
FIG. 1 is a diagrammatic front view of a strapping machine according to the invention, incorporating an ultrasonic welding apparatus also according to the invention.

Referring firstly to FIG. 1, shown therein is a strapping machine 1 which serves for strapping packages 7 with a strapping tape 2 which is drawn off a supply roll 3 by a withdrawal device 4 and fed to a tape magazine 5. From there the tape 2 is passed by means of a tape feed device 6 through a tensioning arrangement 8 to a tape guide means in a tape guide frame 9 so that the tape is laid as a loop around the package 7. The end of the tape is gripped by a tape holder which is not shown in the drawing and then the drive of the tape feed device 6 is reversed. As a result the tape loop is pulled out of the tape guide frame 9 and applied snugly against the package 7 around the periphery thereof. The tensioning arrangement 8 is now activated so that the tape loop is tightened around the package 7, with a predetermined high tensioning force. The leading end of the strapping tape forming the loop around the package 7 is then joined to the trailing end of the tape by means of a closure assembly 10. The closure assembly 10 comprises an ultrasonic welding apparatus according to the invention, which welds the two ends of the loop formed around the package 7 to each other.

A motor 23 is located underneath the closure assembly 10. The motor 23 drives a shaft 24. The shaft 24 is provided with a multitude of cams and cam 25 of this multitude is arranged in the central region of the closure assembly 10. This cam 25 serves as an actuating means for displacement of a ultrasonic sonotrode of the closure assembly 10 which will be described in more detail with reference to FIG. 2.

It will be appreciated that the illustrated closure assembly 10 includes the ultrasonic welding apparatus according to the invention, but the ultrasonic welding apparatus can also be used in other situations of use in which plastic materials in the form of films, sheets or tapes are to be welded together. The ultrasonic welding apparatus according to the invention will be described hereinafter, with reference to FIG. 2, in the context of use in the closure assembly 10 of the machine illustrated in FIG. 1.

Figure 2:
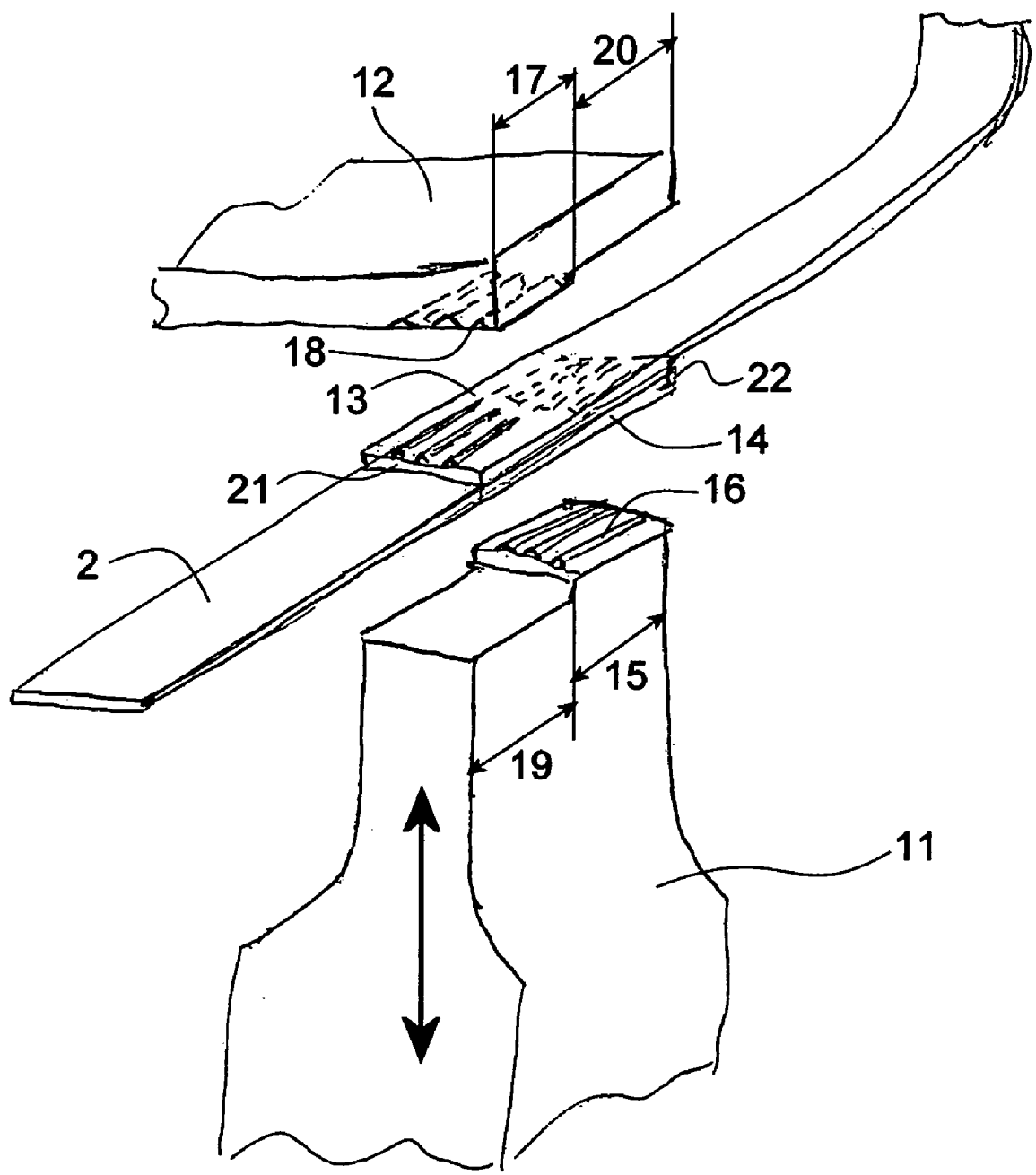
FIG. 2 is a perspective view of the ultrasonic welding apparatus according to the invention as used in the machine of FIG. 1.

Referring therefore now also to FIG. 2 the ultrasonic welding apparatus according to the invention as is used in the closure assembly 10 of the machine shown in FIG. 1 includes an ultrasonic sonotrode 11 and a backing plate 12, against which the ultrasonic sonotrode 11 can be pressed with the interposition of flat workpiece portions to be welded together. It will be appreciated that, in the context of the closure assembly 10 used in the FIG. 1 machine, the flat workpiece portions will be respective end portions of the strapping tape 2 applied around the package 7.

References 13 and 14 in FIG. 2 therefore denote end portions of the strapping tape 2, which are positioned between the sonotrode 11 and the backing plate 12 for the welding operation. During the welding procedure the sonotrode 11 is moved upwardly out of the position shown in FIG. 2 until the end portions 13, 14 of the strapping tape 2 are clamped firmly between the mutually oppositely disposed surfaces of the sonotrode 11 and the backing plate 12 disposed thereabove.

Both the sonotrode 11 and also the backing plate 12 have at least one profiled portion indicated at 15 and 17 respectively, on which a plurality of projections 16 and 18 are provided. The profiled portion 15, 17 of the respective surfaces of the sonotrode 11 and the backing plate 12 extends substantially over half the contact area with the strapping tape 2 where it is to be welded together. The second half of the surface of the sonotrode 11 is formed by a smooth portion 19. Equally, in the second half of the contact area with the tape 2 to be welded, the backing plate 12 has a smooth portion 20. This therefore means that the profiled portion 15 of the surface of the sonotrode 11 is in opposite relationship to the smooth portion 20 of the surface of the backing plate 12, and similarly the profiled portion of the surface of the backing plate, which has the projections, is disposed in opposite relationship to the smooth portion of the surface of the sonotrode 11.

In other embodiments, there may be a plurality of smooth portions and/or plurality of profiled portions. It is not necessary that all smooth and profiled portions oppose each other so that, in some embodiments there may be opposing smooth portions (and/or smooth portions that partially oppose) and/or there may be opposing profiled portions (and/or profiled portions that partially overlap). In an embodiment herein, the profiled portion includes a plurality of projections where the projections may be, for example in the form of ribs of a generally triangular cross-sectional configuration. However, for other embodiments the profiled portions may be any non-smooth surface other than the specific non-smooth surfaces disclosed herein.

It will be seen from FIG. 2 that the above-described profiled configurations of the sonotrode 11 and the backing plate 12 ensures that the projections 16 and 18 of the profiled portions 15 and 17 of the mutually opposite surfaces of the sonotrode 11 and the backing plate 12 are operative to deform the respective tape end portions 13 and 14 of the loop of the strapping tape 2 only in the respective regions in the proximity of their cut edges 21 and 22, by way of which substantially no forces are applied to the welded join formed by the welding apparatus. This therefore ensures that the impressions produced by the projections in the strapping tape 2 will not have any significant effect on the tensile strength of the welded join produced by the welding apparatus.

It will be seen further from FIG. 2 that the projections 16 and 18 are of a height which is less than the thickness of the strapping tape 2. For that reason, the projections 16 and 18 respectively only produce deformation of the tape end portions 13 and 14 in the region adjoining the respective cut edges 21 and 22 thereof. The portion of the welded join between the two tape end portions, which is subjected to the effect of tensile force and which immediately adjoins the loop configuration formed by the strapping tape 2, is at least substantially free from deformation as it bears against a smooth portion 19 and 20 respectively of the respective surface of the sonotrode 11 and the backing plate 12.

By virtue of the fact that the tape end portions are deformed to a lesser degree in the region of the weld to which the tensile forces are applied, the welded join overall enjoys a higher degree of strength. It was also found that the strength values differ less from one welded joint to another so that the welding apparatus according to the invention makes it possible to produce a large number of welds of relatively high and still uniform strength. To expand the foregoing points in somewhat more detail, the fact that the projections which ensure reliable production of the molten region between the workpiece portions to be joined together are arranged in part on a portion of the surface of the sonotrode and for another part on a portion of the surface of the backing plate means that the projections which, in the welding procedure, alter the structure and contour of the workpiece portions, can be placed in such a way as to give rise to the minimum degree of impairment in terms of the strength of the welded join. In particular, the projections can be arranged substantially in such a way that they are impressed into the tape end portions at the location of the weld, which is subjected to only slight mechanical loadings. That ensures, when welding a strapping tape as described hereinbefore, that the high tensile force of the loop which extends for example around the package 7 in FIG. 1 is not applied to the tape portion which has been deformed by the projections and structurally altered thereby. It is this that can contribute substantially to increasing the strength of the welded join.

It will be appreciated that the above-described embodiment of the ultrasonic welding apparatus and the closure assembly in the strapping machine have been set forth solely by way of example and illustration of the principles of the invention and that various other modifications and alterations may be made therein without thereby departing from the spirit and scope of the invention.

What is claimed is:

1. An ultrasonic welding apparatus, comprising:
  an ultrasonic sonotrode;
  a backing plate in opposite relationship to the ultrasonic sonotrode;
  actuating means for displacement of the ultrasonic sonotrode and the backing plate relative to each other for pressing flat workpiece portions therebetween for welding thereof,
  the sonotrode and the backing plate having respective mutually facing surfaces, wherein the surface of said sonotrode includes at least one portion provided with projections and at least one smooth portion, wherein the surface of said backing plate includes at least one portion provided with projections and at least one smooth portion and wherein said smooth portions and said portions with projections are arranged to provide that said smooth portions press against a part of the workpiece portion to which forces are applied to a weld formed by said backing plate and said sonotrode, and wherein said portion of the surface of the sonotrode, which is provided with said projections, is disposed in opposite relationship to a smooth portion of the surface of the backing plate.

2. An ultrasonic welding apparatus, comprising:
  an ultrasonic sonotrode;
  a backing plate in opposite relationship to the ultrasonic sonotrode;
  actuating means for displacement of the ultrasonic sonotrode and the backing plate relative to each other for pressing flat workpiece portions therebetween for welding thereof,
  the sonotrode and the backing plate having respective mutually facing surfaces, wherein the surface of said sonotrode includes at least one portion provided with projections and at least one smooth portion, wherein the surface of said backing plate includes at least one portion provided with projections and at least one smooth portion and wherein said smooth portions and said portions with projections are arranged to provide that said smooth portions press against a part of the workpiece portion to which forces are applied to a weld formed by said backing plate and said sonotrode, and wherein said portion of the surface of the backing plate, which is provided with said projections, is disposed in opposite relationship to a smooth portion of the surface of the sonotrode.

3. Apparatus of claim 2, wherein the portion of the surface of the backing plate, which is provided with projections, extends in a longitudinal direction of the workpiece to be welded over approximately half the total length of said surface of the backing plate.

4. A strapping machine comprising a closure assembly including a welding apparatus for ultrasonic welding of loops of a strapping tape, said welding apparatus comprising:
  an ultrasonic sonotrode;
  a backing plate in opposite relationship to the ultrasonic sonotrode;
  actuating means for displacement of the ultrasonic sonotrode and the backing plate relative to each other for pressing flat workpiece portions therebetween for welding thereof,
  the sonotrode and the backing plate having respective mutually facing surfaces, wherein the surface of said sonotrode includes at least one portion provided with projections and at least one smooth portion, wherein the surface of said backing plate includes at least one portion provided with projections and at least one smooth portion and wherein said smooth portions and said portions with projections are arranged to provide that said smooth portions press against a part of the workpiece portion to which forces are applied to a weld formed by said backing plate and said sonotrode, and wherein said portion of the surface of the sonotrode, which is provided with said projections, is disposed in opposite relationship to a smooth portion of the surface of the backing plate.

5. A strapping machine comprising a closure assembly including a welding apparatus for ultrasonic welding of loops of a strapping tape, said welding apparatus comprising:
  an ultrasonic sonotrode;
  a backing plate in opposite relationship to the ultrasonic sonotrode;

actuating means for displacement of the ultrasonic sonotrode and the backing plate relative to each other for pressing flat workpiece portions therebetween for welding thereof, the sonotrode and the backing plate having respective mutually facing surfaces, wherein the surface of said sonotrode includes at least one portion provided with projections and at least one smooth portion, wherein the surface of said backing plate includes at least one portion provided with projections and at least one smooth portion and wherein said smooth portions and said portions with projections are arranged to provide that said smooth portions press against a part of the workpiece portion to which forces are applied to a weld formed by said backing plate and said sonotrode, and wherein said portion of the surface of the backing plate, which is provided with said projections, is disposed in opposite relationship to a smooth portion of the surface of the sonotrode.

6. Strapping machine of claim 5, wherein the portion of the surface of the backing plate, which is provided with projections, extends in a longitudinal direction of a tape to be welded over approximately half the total length of said surface of the backing plate.

7. An ultrasonic welding apparatus, comprising:
an ultrasonic sonotrode having a first face with smooth and profiled portions; and
a backing plate having a second face with smooth and profiled portions, at least one of the sonotrode and backing plate being displaceable to press a workpiece between the first and second faces, wherein said smooth portions and said profiled portions are arranged to provide that said smooth portions press against a part of the workpiece to which forces are applied to a weld formed by said backing plate and said sonotrode, and wherein at least one smooth portion of one of the faces is disposed in opposite relationship to at least one profiled portion of the other one of the faces.

8. Apparatus of claim 7, wherein all of said smooth portions of the faces are disposed in opposite relationship to profiled portions of the faces.

9. Apparatus of claim 7, wherein the first face has one smooth portion and one profiled portion.

10. Apparatus of claim 9, wherein the first face has one smooth portion and one profiled portion.

11. An ultrasonic welding apparatus, comprising:
an ultrasonic sonotrode having a first face with smooth and profiled portions; and
a backing plate having a second face with smooth and profiled portions, at least one of the sonotrode and backing plate being displaceable to press a workpiece between the first and second faces, wherein said smooth portions and said profiled portions are arranged to provide that said smooth portions press against a part of the workpiece to which forces are applied to a weld formed by said backing plate and said sonotrode, wherein the first face has one smooth portion and one profiled portion, wherein the first face has one smooth portion and one profiled portion, and wherein at least part of the smooth portion of the first face is disposed opposite to at least part of the profiled portion of the second face.

12. Apparatus of claim 11, wherein at least part of the profiled portion of the first face is disposed opposite to at least part of the smooth portion of the second face.

13. Apparatus of claim 7, wherein the profiled portions include a plurality of projections.

14. Apparatus of claim 13, wherein at least some of the plurality of projections have a substantially triangular cross-section.

15. An ultrasonic welding apparatus, comprising:
an ultrasonic sonotrode;
a backing plate in opposite relationship to the ultrasonic sonotrode;
actuating means for displacement of the ultrasonic sonotrode and the backing plate relative to each other for pressing flat workpiece portions therebetween for welding thereof,
the sonotrode and the backing plate having respective mutually facing surfaces, wherein the surface of said sonotrode includes at least one portion provided with projections and at least one smooth portion, wherein the surface of said backing plate includes at least one portion provided with projections and at least one smooth portion and wherein said smooth portions and said portions with projections are arranged to provide that said smooth portions press against a part of the workpiece portion to which forces are applied to a weld formed by said backing plate and said sonotrode, and wherein said portion of the surface of the sonotrode, which is provided with said projections, is disposed in opposite relationship to a smooth portion of the surface of the backing plate and wherein said portion of the surface of the backing plate, which is provided with said projections, is disposed in opposite relationship to a smooth portion of the surface of the sonotrode.

16. A strapping machine comprising a closure assembly including a welding apparatus for ultrasonic welding of loops of a strapping tape, said welding apparatus comprising:
an ultrasonic sonotrode;
a backing plate in opposite relationship to the ultrasonic sonotrode;
actuating means for displacement of the ultrasonic sonotrode and the backing plate relative to each other for pressing flat workpiece portions therebetween for welding thereof,
the sonotrode and the backing plate having respective mutually facing surfaces, wherein the surface of said sonotrode includes at least one portion provided with projections and at least one smooth portion, wherein the surface of said backing plate includes at least one portion provided with projections and at least one smooth portion and wherein said smooth portions and said portions with projections are arranged to provide that said smooth portions press against a part of the workpiece portion to which forces are applied to a weld formed by said backing plate and said sonotrode, and wherein said portion of the surface of the sonotrode, which is provided with said projections, is disposed in opposite relationship to a smooth portion of the surface of the backing plate and wherein said portion of the surface of the backing plate, which is provided with said projections, is disposed in opposite relationship to a smooth portion of the surface of the sonotrode.

* * * * *